United States Patent [19]

Kleinschmit et al.

[11] 4,434,135

[45] Feb. 28, 1984

[54] GAS BLACK BURNER

[75] Inventors: Peter Kleinschmit; Manfred Voll, both of Hanau; Richard Engel, Bernheim-Waldof, all of Fed. Rep. of Germany

[73] Assignee: Degussa Aktiengesellschaft, Frankfurt am Main, Fed. Rep. of Germany

[21] Appl. No.: 352,616

[22] Filed: Feb. 26, 1982

Related U.S. Application Data

[63] Continuation of Ser. No. 171,204, Jul. 22, 1980, abandoned.

[30] Foreign Application Priority Data

Aug. 7, 1979 [DE] Fed. Rep. of Germany ....... 2931907

[51] Int. Cl.³ .............................................. C09C 1/48
[52] U.S. Cl. .................................. 422/150; 422/153; 422/155; 423/452; 239/567; 239/568
[58] Field of Search ................................. 422/150–158; 423/452; 239/567, 568; 431/349; 29/DIG. 26, 157 C

[56] References Cited

U.S. PATENT DOCUMENTS

| 660,973 | 10/1900 | Sanders | 422/154 |
|---|---|---|---|
| 1,904,469 | 4/1933 | Keller | 239/568 |
| 2,399,591 | 4/1946 | Amon | 423/452 |
| 2,599,633 | 6/1952 | Hoffmeister et al. | 422/154 |
| 3,141,358 | 7/1964 | Burke, Jr. et al. | 29/157 C |
| 3,584,786 | 6/1971 | Johnson | 239/568 |
| 3,837,789 | 9/1974 | Schindler et al. | 239/568 |

FOREIGN PATENT DOCUMENTS 119388  1/1945  Australia ................. 157/DIG. 26

*Primary Examiner*—Michael S. Marcus
*Attorney, Agent, or Firm*—Beveridge, DeGrandi & Kline

[57] ABSTRACT

A gas black burner is described which is used normally in connection with a rotating cooling roller as a deposition surface, so that its discharge openings for the operating gas containing the raw material for the carbon black are directed against the cooled deposition surface. The burner is characterized by the fact that it is formed as a pipe shaped chamber provided with at least one supply line and disposed in parallel relationship to the deposition surface, which chamber has slit shaped discharge openings in its jacket.

The invention relates to a gas black burner with openings to be directed against a cooled deposition surface.

4 Claims, 2 Drawing Figures

COOLED SURFACE

GAS SUPPLY

GAS BLACK BURNER

This application is a continuation of application Ser. No. 171,204, filed July 22, 1980, now abandoned.

BACKGROUND AND PRIOR ART

In the art of the gas black process, aromatic hydrocarbons, such as for example, coal tar naphtha or pyrolysis residual oils are vaporized under defined conditions in a carrier gas stream and are pyrolyzed in special carbon black producing apparatuses with the help of special gas black burners in a multiplicity of relatively small diffusion flames, whereby a part of the raw material burns. The flames impinge agianst a water filled, slowly rotating hollow iron roller, which serves as the deposition surface. The carbon black deposited there is removed by scrapers and conveyed to the processing plant. Filter arrangements separate the portion of carbon black carried along in the exhaust gases.

From Ullmann's Encyclopedia of Chemical Engineering, 3rd Edition, Volume 14, Page 799 (1963), a carbon black producing apparatus is knwon wherein a gas black burner and a deposition roller are disposed jointly in a housing. The water cooled deposition roller has a diameter of 0.5 m and a length of 5 m, it rotates at about 1 rpm. At the upper part of the housing, the exhaust gas is sucked off and is guided by way of pipe lines to the filter plant. The combustion air enters through the open underside of the housing.

In this known gas black apparatus, individual cast iron burners disposed side by side are used which produce a fanshaped diffusion flame by means of a flat nozzle disposed perpendicularly to the axis of the deposition roller. These burners are positioned onto connections located in the jacket of the gas supply pipe. The gas supply pipe is disposed below the cooling roller in parallel to its axis. The distance of the burner nozzles is selected such that the flames burn against the rotating roller and are chilled thereby.

These known burners suffer the disadvantage that the narrow opening of the flat nozzles which has a width of below 1 mm, require cleaning several times daily during operation and must be milled out after an operating time of about 3 weeks. This expensive cleaning and reprocessing procedure is necessary as a result of the scaling and deformation of the burner material which takes place, and a result of carbonization in the orifice of the nozzle, the latter being partially closed. The useful life of such a burner is limited thereby to about 3-4 months.

Figure 1:
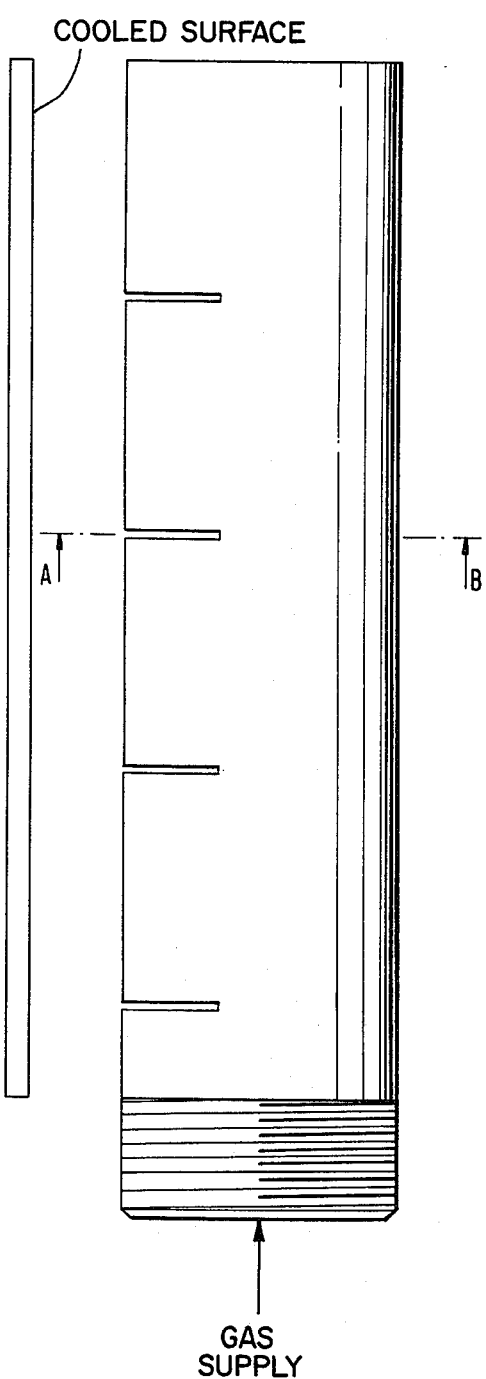
FIG. 1 is a plan view of the pipe chamber of the present invention.

SUMMARY OF THE INVENTION apparatus which is easy to manufacture, needs only a low servicing expenditure and makes possible a long working life.

It is the object of the invention to provide a gas black burner with openings that are directed towards the cooled deposition surface.

The burner is characterized by the fact that it consists of a pipe shaped chamber provided with at least one supply line and is disposed in parallel to the deposition surface, which chamber has slit shaped discharge openings in its jacket.

The gas black burner of the invention is used customarily in connection with a revolving cooling roller. For this purpose, it may be disposed below said roller. The slit shaped discharge openings for the operating gas containing the raw material for the carbon black are turned at the same time toward the roller. The chamber with its slit shaped discharge openings disposed in the jacket may be made in the form of a pipe with any arbitrary cross sectional profile. In the simplest case, the chamber consists of a unilaterally closed cylinder which on the free front surface is provided with a feed connection or passes over into said feed connection. In the case of the selection of the cross sectional profile for the chamber to be used, the shape of the deposition surface may also be a determining factor.

The gas black burner may be developed in such a way that the supply line leads into one or both front surfaces and/or into the unslit jacket part of the pipe shaped chamber.

A simple and effective embodiment of the invention provides that the slit shaped discharge openings, which may optionally be polished, are disposed mutually in parallel. The slit shaped discharge openings may be disposed at an angle of 45-135° in relation to the longitudinal axis of the pipe shaped chamber. In practice, it was determined to be advantageous to dispose the slit shaped discharge openings perpendicularly in relation to the longitudinal axis of the pipe shaped chamber.

The distance of the gas black burner of the invention in relation to the cooling roller is selected such that a suitable chilling of the flames will be ensured.

Preferably, the slit shaped discharge openings are disposed at a uniform distance from one another. The distances of the slits one from the other should at the same time be selected such that a uniform formation of the carbon black be ensured. It has turned out to be of advantage to provide 2-12, preferably 3-8 slots per meter of length of chamber.

It is particularly favorable whenever the slit shaped discharge openings at room temperature have a width of 0.3 to 2.0 mm, preferably 0.4 to 1.0 mm. In the case of increasing the temperature during the operation of the gas black burner, the slits are narrowed down correspondingly to the expansion coefficient of the pipe material.

Furthermore, it is advantageous that the ratio of the length of each slit shaped discharged opening to the periphery of the pipe shaped chamber ranges from 1:36 to 1:2, preferably to 1:6 to 1:3. This means that in the case of a gas black burner according to the invention, with a diameter of a pipe shaped jacket for example of circular cross section of 60 mm, the slits have a length between 11 and 201 mm, preferably between 67 and 137 mm. Preferably, the gas black burner is made of refractory scale resistant material. The thickness of wall of the pipe shaped chamber is not critical as long as a sufficient mechanical strength exists. Likewise, the length of the pipe shaped jacket is not critical; however it should correspond to the length of the deposition surface roller.

DETAILED DESCRIPTION OF THE DRAWINGS

FIG. 1 shows a plan view of the burner of the present invention for producing gas black which is formed of a pipe shaped chamber with a circular cross-section and which is provided with a supply line for operating gas containing the raw material for the carbon black. The supply line is shown schematically. The slit shaped discharge openings shown in the drawing are in the walls of the pipe shaped chamber and are directed towards the cooled deposition surface as shown schematically. As may be seen from the drawing, the slit shaped openings are disposed essentially perpendicular in relation to the longitudinal axis of the chamber. The length of each slit shaped opening ranges from 1:36 to 1:2 with regard to the circumference of the chamber.

Figure 2:
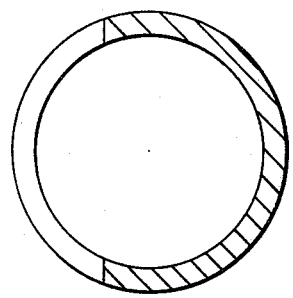
FIG. 2 is a cross sectional view along the line A—B of FIG. 1.

FIG. 2 is a cross-sectional view of the pipe shaped chamber and shows that it has a circular cross-section.

DETAILED DESCRIPTION OF THE INVENTION

The advantages of the gas black burner of the invention will be explained subsequently on the basis of a comparative example:

A carbon black with a mean primary particle size of 12 nm on the one hand was produced using the conventional burner previously discussed (comparatiave experiment) and on the other hand with the gas black burner of the invention according to FIG. 1.

In the case of the comparative experiment, eight traditional cast iron, flat nozzle burners were disposed per meter (0.6 mm width of slit) side by side beneath the cooling roller in such a way that the flames struck against the roller. The flat nozzle openings were adjusted perpendicularly in relation to the axis of the cooling roller. These traditional burners had to be cleaned on the average of every six hours and had to be remilled every 25 days and achieved a useful life of only about three months. This corresponds to a consumption rate of approximately 150 burners per annum and gas black apparatus.

The same carbon black was now produced in a gas black apparatus equipped with the gas black burner according to the invention. In the case of this apparatus, the burner was like-wise disposed below and in parallel to the cooling roller in such a way that the flames impinged against the roller surface. The same burner distance in relation to the roller was maintained as in the case of the comparative example.

The burner consisted of a unilaterally closed pipe shaped chamber with circular cross section of about 63.5 mm, and a wall thickness of 4.0 mm made of chromium-silicon steel, which chamber at its open end was equipped with a supply pipe for the components to be fed in. In the jacket of the pipe shaped chamber, eight slit shaped discharge openings per meter had been milled in perpendicularly to the axis of the chamber. The width of the slit was 1 mm in the cooled state; it narrowed down in the operation of the apparatus to about 0.6 mm. The length of the slit amounted to one third of the periphery of the pipe shaped chamber.

The burner slits of the gas black burner of the invention needed cleaning in continuous operation only every 24 hours, because the crust of coke in the discharge opening was considerably reduced and no visible scaling took place. The burner pipes therefore in the continuous operation achieved a useful life of more than two years without there being any necessity for remilling the slits.

An additional advantage of the gas black burner of the invention is to be seen in the simple method of construction which requires no complicated mold casting. Commercial pipes may be used which moremover may be more easily processed as mold casting parts.

We claim:

1. A burner for producing gas black comprising a pipe shaped chamber with circular cross-section provided with at least one means for supplying the operation gas containing the raw material for the carbon black, and a cooled deposition surface, the wall of said chamber having slit shaped openings disposed in parallel to one another and at mutually uniform distances in said wall for discharging said gas into the surrounding air and establishing a carbon black forming diffusion flame, there being present 3 to 8 slits per meter of chamber length, each of said slits at room temperature having a width of 0.4 to 1 mm, the slits being directed against said cooled deposition surface, and the length of each slit shaped opening ranging from 1:36 to 1:2 with respect to the circumference of said chamber, said pipe shaped chamber being formed of a scale resistant material.

2. The gas black burner as in claim 1, wherein the slit shaped discharge openings are polished and disposed in parallel to one another.

3. The gas black burner as in claim 1, wherein the slit shaped discharge openings are disposed at an angle of 45 to 135° in relation to the longitudinal axis of the pipe shaped chamber.

4. The gas black burner as in claim 1, wherein the ratio of the length of each slit shaped discharge opening to the circumference of the pipe shaped chamber ranges from 1:6 to 1:3.

* * * * *